(12) United States Patent
Chung et al.

(10) Patent No.: US 11,660,964 B2
(45) Date of Patent: May 30, 2023

(54) SYSTEM AND METHOD FOR CONTROLLING FUNCTIONS OF A VEHICLE USING A DETACHABLE CONTROL DEVICE

(71) Applicants: HYUNDAI MOTOR COMPANY, Seoul (KR); KIA CORPORATION, Seoul (KR)

(72) Inventors: Jae Hoon Chung, Seoul (KR); Si Hoon Sung, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/506,221

(22) Filed: Oct. 20, 2021

(65) Prior Publication Data
US 2022/0118853 A1    Apr. 21, 2022

(30) Foreign Application Priority Data
Oct. 21, 2020    (KR) .................... 10-2020-0136786

(51) Int. Cl.
*B60K 37/06*    (2006.01)
*G06F 3/0362*    (2013.01)
(Continued)

(52) U.S. Cl.
CPC .............. *B60K 37/06* (2013.01); *G06F 3/038* (2013.01); *G06F 3/0362* (2013.01); *H01F 7/20* (2013.01);
(Continued)

(58) Field of Classification Search
CPC ............ B60K 37/06; B60K 2370/1537; B60K 2370/52; B60K 2370/828;
(Continued)

(56) References Cited

U.S. PATENT DOCUMENTS

| 5,936,613 | A | * | 8/1999 | Jaeger | ................ | G02F 1/13306 |
| | | | | | | 345/184 |
| 10,705,629 | B1 | * | 7/2020 | Arnold | ................ | G06F 3/03547 |

(Continued)

FOREIGN PATENT DOCUMENTS

| KR | 20200075157 A | 6/2020 |
| KR | 20210017243 A | 2/2021 |

*Primary Examiner* — Ariel A Balaoing
(74) *Attorney, Agent, or Firm* — Lempia Summerfield Katz LLC

(57) ABSTRACT

Disclosed is a user interface capable of controlling various functions of a vehicle, and more particularly a vehicle function control system and a control method using a detachable control device. A method of controlling an integrated control unit includes: recognizing a first detachable control device attached to a first attachment position among at least one attachment position provided at an attachment unit; establishing a first data path with the first detachable control device; transmitting information about a first function to be controlled corresponding to the first attachment position to the first detachable control device through the first data path; and when receiving first manipulation information from the first detachable control device, controlling the first function to be controlled based on the first manipulation information.

17 Claims, 14 Drawing Sheets

(51) Int. Cl.
  *G06F 3/038*   (2013.01)
  *H01F 7/20*    (2006.01)
  *G05G 1/08*    (2006.01)

(52) U.S. Cl.
  CPC ............... *B60K 2370/126* (2019.05); *B60K 2370/1537* (2019.05); *B60K 2370/52* (2019.05); *B60K 2370/828* (2019.05); *G05G 1/08* (2013.01); *G06F 2203/0384* (2013.01)

(58) Field of Classification Search
  CPC . B60K 2370/126; G06F 3/0362; G06F 3/038; G06F 2203/0384; H01F 7/20; G05G 1/08
  See application file for complete search history.

(56) References Cited

U.S. PATENT DOCUMENTS

| | | |
|---|---|---|
| 11,084,379 B2 | 8/2021 | Sung et al. |
| 2005/0189820 A1* | 9/2005 | Blumenthal ............. H01H 5/02 |
| | | 307/104 |
| 2018/0084937 A1* | 3/2018 | Joo ......................... F24C 3/124 |
| 2018/0154774 A1* | 6/2018 | Park ......................... G06F 3/017 |
| 2018/0373350 A1* | 12/2018 | Rao ......................... B60K 35/00 |
| 2019/0391672 A1* | 12/2019 | Fischer ................... B60K 37/06 |
| 2020/0117288 A1* | 4/2020 | Lopez ..................... G01P 13/04 |
| 2020/0189392 A1 | 6/2020 | Sung et al. |
| 2021/0039496 A1 | 2/2021 | Sung et al. |
| 2022/0134884 A1* | 5/2022 | Chung .................. G08C 17/02 |
| | | 345/184 |

\* cited by examiner

200A+200B+200C 200A
200B
200C

SYSTEM AND METHOD FOR CONTROLLING FUNCTIONS OF A VEHICLE USING A DETACHABLE CONTROL DEVICE

This application claims priority to and the benefit of Korean Patent Application No. 10-2020-0136786, filed on Oct. 21, 2020, the entire contents of which are incorporated herein by reference.

BACKGROUND

Field

The present disclosure relates to a user interface capable of controlling various functions of a vehicle, and more particularly a vehicle function control system using a detachable control device and to a control method thereof.

Discussion of the Related Art

The statements in this section merely provide background information related to the present disclosure and may constitute prior art.

Vehicles released in recent years are equipped with various kinds of electronic equipment, and thus the functions that can be controlled by users have become more diverse in terms of kind and range. Accordingly, control systems therefor are complicated, and the amount of information to be displayed at the same time is increased. Due to this trend, the size of a display, which displays the operation state of a vehicle, multimedia information, navigation information, and the like, has gradually increased. In addition, because a driver will not need to drive an autonomous vehicle when the same is popularized in the near future, the demand for watching content during travel may increase. Consequently, is expected that the size of a display provided in the vehicle will be further increased.

Generally, a central-control-point (CCP)-based tree-type menu structure is used for controlling functions that are displayed and controlled on a display, and some vehicles provide a voice recognition function for control of the same. However, we have discovered that the CCP-based control method is complicated due to the large number of manipulation steps (depths) depending on the functions to be controlled. The control method using voice recognition has relatively simple manipulation steps, but the usage rate thereof is remarkably reduced when passenger is present.

SUMMARY OF THE PRESENT DISCLOSURE

The present disclosure provides a system and method for controlling a function of vehicle using a detachable control device.

In one form, the present disclosure provides a vehicle function control system and method capable of improving user convenience.

In particular, the present disclosure provides a vehicle function control system and method enabling a user to control various functions of a vehicle using a detachable control device.

In one form the present disclosure, a method of controlling an integrated control unit may include: recognizing a first detachable control device attached to a first attachment position among at least one attachment position provided at an attachment unit, establishing a first data path with the first detachable control device, transmitting information about a first function to be controlled corresponding to the first attachment position to the first detachable control device through the first data path, and when receiving first manipulation information from the first detachable control device, controlling the first function to be controlled based on the first manipulation information.

In addition, a vehicle function control system according to an embodiment of the present disclosure may include a wireless transceiver, an attachment unit including, at least one attachment position, and a controller configured to, when recognizing a first detachable control device attached to a first attachment position among the at least one attachment position, establish a first data path with the first detachable control device using the wireless transceiver, to transmit information about a first function to be controlled corresponding to the first attachment position to the detachable control device through the first data path, and to, when receiving first manipulation information from the first detachable control device, control the first function to be controlled based on the first manipulation information.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

Figure 1:
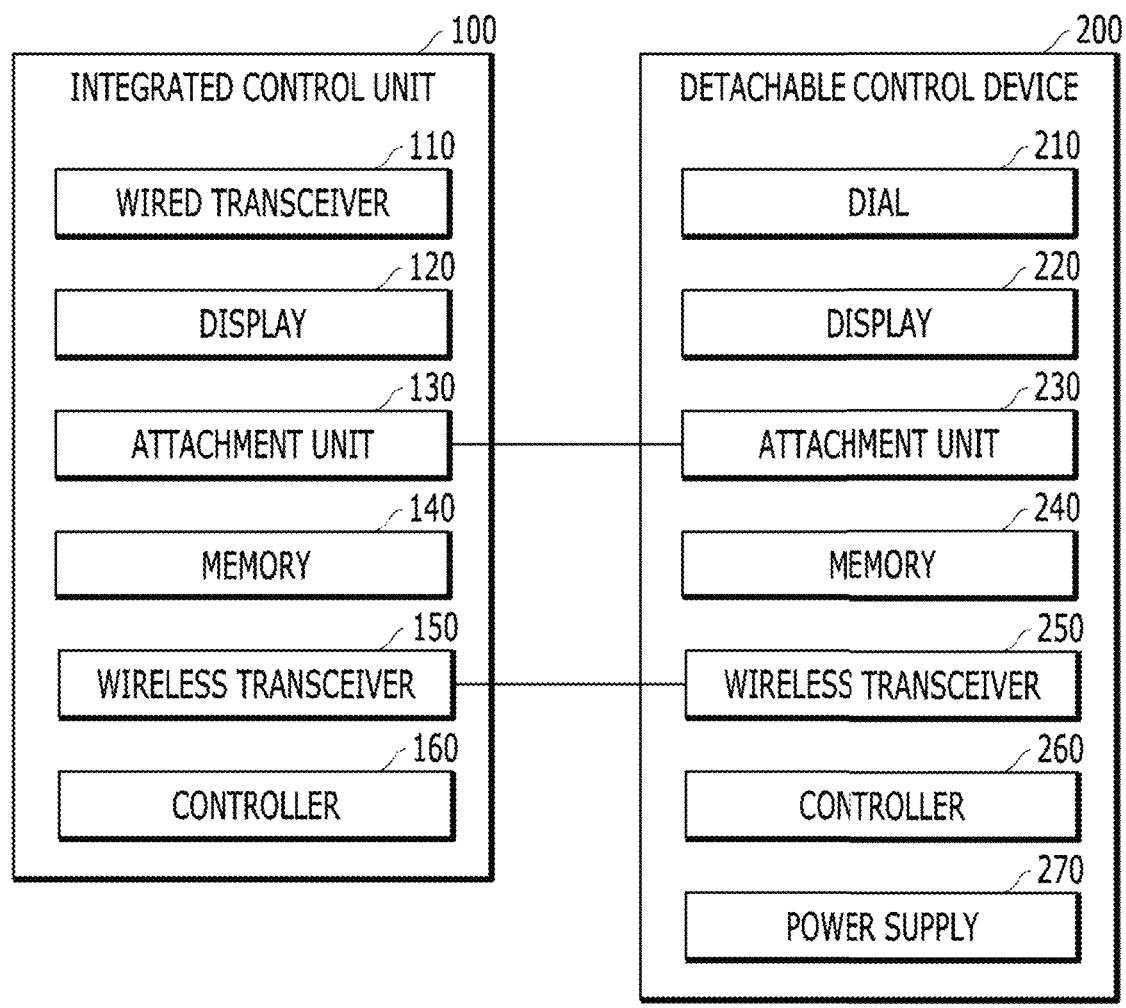
FIG. 1 shows an example of the structure of a vehicle function control system including a detachable control device according to an embodiment of the present disclosure.

The drawings described herein are for illustration purposes only and are not intended limit the scope of the present disclosure in any way.

DETAILED DESCRIPTION OF THE PRESENT DISCLOSURE

Hereinafter, embodiments of the present disclosure are described below in detail with reference to the accompanying drawings so that those having ordinary skill in the art may easily carry out the embodiments. The present disclosure may, however, be embodied in many different forms, and should not be construed as being limited to the embodiments set forth herein. In the drawings, parts irrelevant to the description of the present disclosure are omitted for clarity. Like reference numerals refer to like elements throughout the specification.

Throughout the specification, when a certain part "includes" or "comprises" a certain component, this indicates that other components are not excluded, and may be further included unless otherwise noted. The same reference numerals used throughout the specification refer to the same constituent elements.

When a component, device, element, or the like of the present disclosure is described as having, a purpose or performing, an operation, function, or the like, the component, device, or element should be considered herein as being "configured to" meet that purpose or to perform that operation or function.

The operations of the method or the algorithm described in connection with the forms disclosed herein may be embodied directly in a hardware (e.g., a processor) or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, a CD-ROM.

An embodiment of the present disclosure proposes a vehicle function control system and method enabling a user to control various functions of a vehicle using at least one detachable control device provided with a display, which is attached to a certain point in the vehicle.

First, the structure of a vehicle function control system including a detachable control device to which embodiments of the present disclosure are applicable is described with reference to FIG. 1. FIG. 1 shows an example of the structure of a vehicle function control system including a detachable control device according to an embodiment of the present disclosure.

Referring to FIG. the vehicle function control system according, to the embodiment may include an integrated control unit 100 and at least one detachable control device 200.

The integrated control unit 100 may include wired transceiver 110, a display 120, an attachment unit 130, a memory 140, a wireless transceiver 150, and a controller 160. Hereinafter, the above components are described below in detail.

The wired transceiver 110 may exchange data with control units that are provided in the vehicle and respectively control a plurality of functions. For example, the wire transceiver 110 may support at least one of vehicle communication schemes such as CAN, CAN-FD, LIN, and Ethernet. In another example, the wired transceiver 110 may receive operation state information from an air-conditioning control unit for controlling an air-conditioning function, a body control unit for controlling convenience functions such as adjustment of a seat, and an audio/video/navigation (AVN) system, and may transmit control commands to the same.

The display 120 serves to visually output the operation state of the vehicle or various kinds of information desired for a driver, such as navigation information, information about the operation state of an air-conditioning system, and information about the reproduction state of a multimedia system. In the case in which the display is configured as a touchscreen, the display may display a virtual control unit for controlling at least some functions thereof, and may sense a touch command input through the virtual control unit.

The attachment unit 130 may sense attachment or detachment of the detachable control device 200, which is described below. For example, the attachment unit 130 may include at least one of a Hall sensor for detecting magnetic force, a nearfield communication (NFC) transceiver for performing NFC communication, a wireless charging transmitter for sensing a wireless charging receiver, a light receiver for recognizing a specific light emission pattern, or a capacitance sensor for sensing a change in capacitance. In other words, in the case in which the detachable control device 200 is provided with a permanent magnet, the detachable control device 200 may be sensed by the Hall sensor. In the case in which the detachable control device 200 is provided with an NFC tag, the detachable control device 200 may be sensed by the NFC transceiver. In the case in which the detachable control device 200 is provided with a wireless charging receiver, the detachable control device 200 may be sensed by the wireless charging transmitter. Of course, these sensing means are merely illustrative, and the present disclosure is not limited thereto. In addition, the attachment unit 130 may include an attachment means for securing the detachable control device 200 to one or more predetermined attachment positions. For example, the attachment means may include a plurality of permanent magnets or electromagnets disposed so as to form a predetermined pattern. In one form, the detachable control device 200 may be provided at least with permanent magnets so as to correspond to the configuration of the attachment unit 130. This is described below.

In some embodiments, at least one of the display 120 or the attachment unit 130 may be disposed in the vehicle at a different position from the remaining components constituting the integrated control unit 100 so as to be spaced apart therefrom.

The memory 140 may store therein an operating system for driving the integrated control unit 100, various applications configured to be operated in the operating system, multimedia content, input/output control information, and the like.

The wireless transceiver 150 may be connected at least to a wireless transceiver 250 of the detachable control device 200 using a short-range communication protocol (e.g. Bluetooth, Wi-Fi, ZigBee, or NFC), a 3/4/5G protocol, etc. to exchange data with the same. Of course, in some embodiments, the wireless transceiver 150 may communicate with another sensor or control unit provided in the vehicle.

The controller 160 may perform overall control of the respective components described above. The controller 160 may perform determination and calculation desired to control a function to be controlled through interworking with the detachable control device according to embodiments of the present disclosure to be described later.

In one form, the detachable control device 200 may include a dial (or a wheel) 210, a display 220, an attachment unit 230, a memory 240, a wireless transceiver 250, a controller 260, and a power supply 270.

The dial 210 may include a wheel encoder (not shown) for sensing the rotation state thereof. The display may be disposed on the upper surface of the detachable control device 200, and may have a circular shape so as to correspond to the shape of the upper surface of the detachable control device. However, the present disclosure is not limited thereto.

The attachment unit 230 may have an attachment means corresponding to the configuration of the attachment unit 130 of the integrated control unit 100. As an example of the attachment means, a plurality of magnetic bodies (e.g., 231 shown in FIGS. 8 and 12) may be disposed on the bottom surface (the outer bottom surface or the inner bottom surface) of the detachable control device 200 so as to form a predetermined pattern. Each of the magnetic bodies may be made or iron, nickel, cobalt, a magnet, or an alloy thereof. However, the present disclosure is not limited thereto. In some embodiments, the magnetic bodies may be configured as electromagnets or may be configured as combinations of permanent magnets and electromagnets.

The memory 240 may store therein an operating system for driving the detachable control device 200, identification information about each function to be controlled, input/output control information on the detachable control device 200, and the like.

The wireless transceiver 250 may be connected at least to the wireless transceiver 150 of the integrated control unit 100 using a short-range communication protocol (e.g., Bluetooth, Wi-Fi, ZigBee, or NFC), a 3/4/5G protocol, etc. to exchange data with the same. In the case in which plurality of detachable control device 200 is used together, the wireless transceiver 250 may determine whether another detachable control device is attached to a corresponding detachable control device in a stacking manner, and may exchange data with the other detachable control device upon determining the stacked structure. In this case, the wireless transceiver 250 may be connected to a wireless transceiver of the other detachable control device through a communication proto col different from that through which the wireless transceiver 250 is connected to the wireless transceiver 150 of the integrated control unit 100. For example, the wireless transceiver 250 may be connected to the wireless transceiver 150 of the integrated control unit 100 via Bluetooth, and may communicate with the wireless transceiver of the other detachable control device via NFC. However, the present disclosure is not limited thereto.

The controller 260 may perform overall control of the respective remaining components. The controller 260 may perform determination and calculation necessary to control a function to be controlled through interworking with the integrated control unit 100 according to embodiments of the present disclosure to be described later.

The power supply 270 may include a rechargeable battery and may supply power to the remaining components of the detachable control device 200. In addition, in the case in which the attachment unit 130 of the integrated control unit 100 is provided with a wireless charging transmitting coil, the power supply 270 may include a wireless charging receiving coil in order to charge the rechargeable battery.

Figure 2:
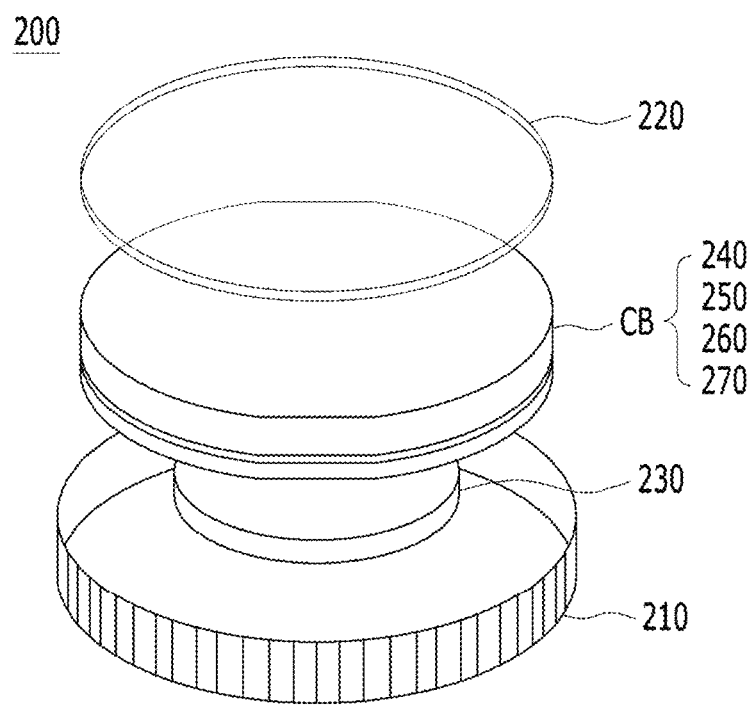
FIG. 2 is a view showing the structure of a detachable control device according to an embodiment of the present disclosure.

FIG. 2 is a view showing the structure of a detachable control device according to an embodiment of the present disclosure.

Referring to FIG. 2, the detachable control device 200 according to the embodiment may have a disc-shaped external appearance. Specifically, the detachable control device 200 may be configured in a form in which a toroidal or ring-shaped dial 210 forms the circumference thereof.

The dial 210 may be configured to be rotatable along the outer circumference of the detachable control device 200 in the clockwise direction or in the counterclockwise direction. The dial 210 may include a wheel encoder capable of sensing at least the rotation direction and the degree of rotation (e.g. displacement or angle) thereof when a user holds and rotates the same. Of course, this is merely illustrative, and the present disclosure is not limited to any specific means or method for sensing rotation.

The display 220 may be disposed on the upper surface of the detachable control device.

A substrate CB may be disposed under the display 220. The memory 240, the wireless transceiver 250, the controller 260, and the power supply 270 may be disposed on the substrate CB.

In addition, the attachment unit 230 may be disposed under the substrate CB.

In addition, the detachable control device 200 may further include a housing (not shown) surrounding at least portions of the display 220, the substrate CB, and the attachment unit 230.

Figure 3:
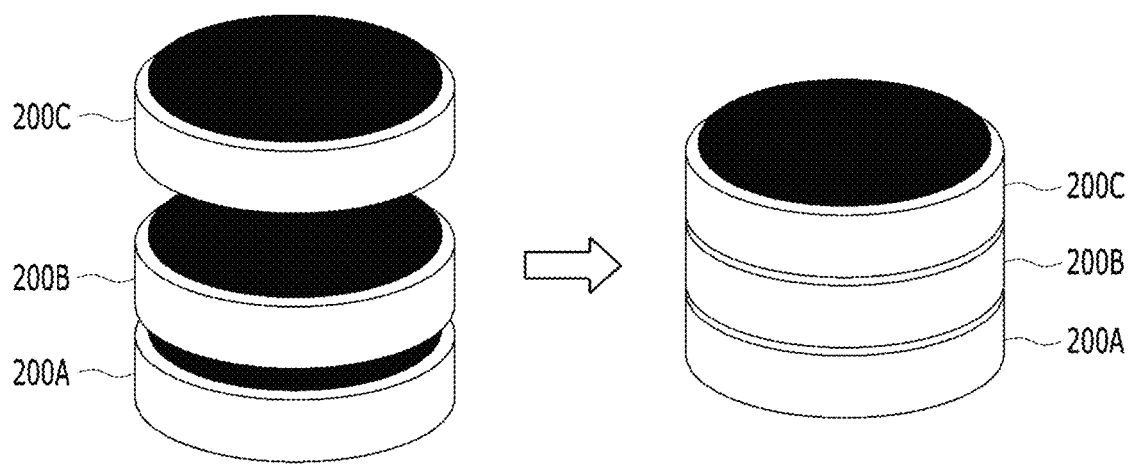
FIG. 3 is a view showing the stacked structure of detachable control devices according to an embodiment of the present disclosure.

FIG. 3 is a view showing the stacked structure of detachable control devices according to an embodiment of the present disclosure.

As shown in the drawing on the left in FIG. 3, a plurality of detachable control devices 200A, 200B and 200C may be provided. In this case, the detachable control devices 200A, 200B and 200C may be stacked so as to overlap each other in a vertical direction, as shown in the drawing on the right in FIG. 3.

When stacked so as to overlap each other in the vertical direction, adjacent ones of the detachable control devices 200A, 200B and 200C may be secured to each other through the attachment units 230 thereof, and may exchange data with each other through the wireless transceivers 250 thereof. For example, in the case in which the attachment units 230 thereof are provided with permanent magnets or electromagnets, adjacent ones of the detachable control devices 200A, 200B and 200C stacked in the vertical direction may be maintained in the state of being secured to each other by magnetic force. In addition, each of the detachable control devices 200A, 200B and 200C stacked in the vertical direction may read the tag of the detachable control device disposed thereunder through an NFC scheme to determine the state of contact therewith and to acquire identification information therefrom. In another example, adjacent ones or the detachable control devices 200A, 200B and 200C stacked in the vertical direction may determine the distance relationship and the positional relationship (vertical positional relationship) therebetween through a scheme employing Bluetooth Low Energy (BLE).

In some embodiments, in order to enable the detachable control devices to be more stably secured to each other when stacked, each of the detachable control devices may further include a permanent magnet or an electromagnet, disposed separately from the attachment unit 230, on the rear surface of the display 220, thereby forming strong magnetic coupling with the attachment unit of another detachable control device disposed on the upper surface thereof.

Figure 4:
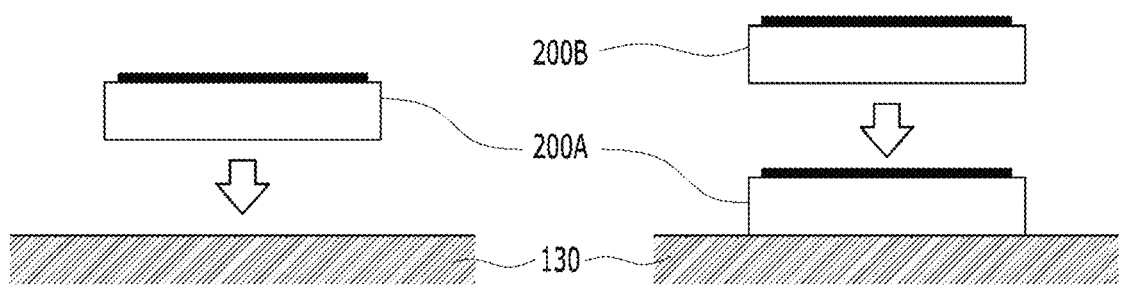
FIG. 4 is view showing attachment method of detachable control devices according to an embodiment of the present disclosure.

FIG. 4 is a view showing an attachment method of the detachable control devices according to an embodiment of the present disclosure.

As shown in the drawing on the left in FIG. 4, one detachable control device 200A may first be attached onto the attachment unit 130 of the integrated control unit 100, and thereafter another detachable control device 200B may be attached onto the detachable control device 200A attached onto the integrated control unit 100. Different therefrom, as shown in the drawing on the right in FIG. 3, a plurality of detachable control devices may first be stacked on one another, and thereafter the stacked assembly of the detachable control devices may be attached onto the attachment unit 130 of the integrated control unit 100.

Figure 5:
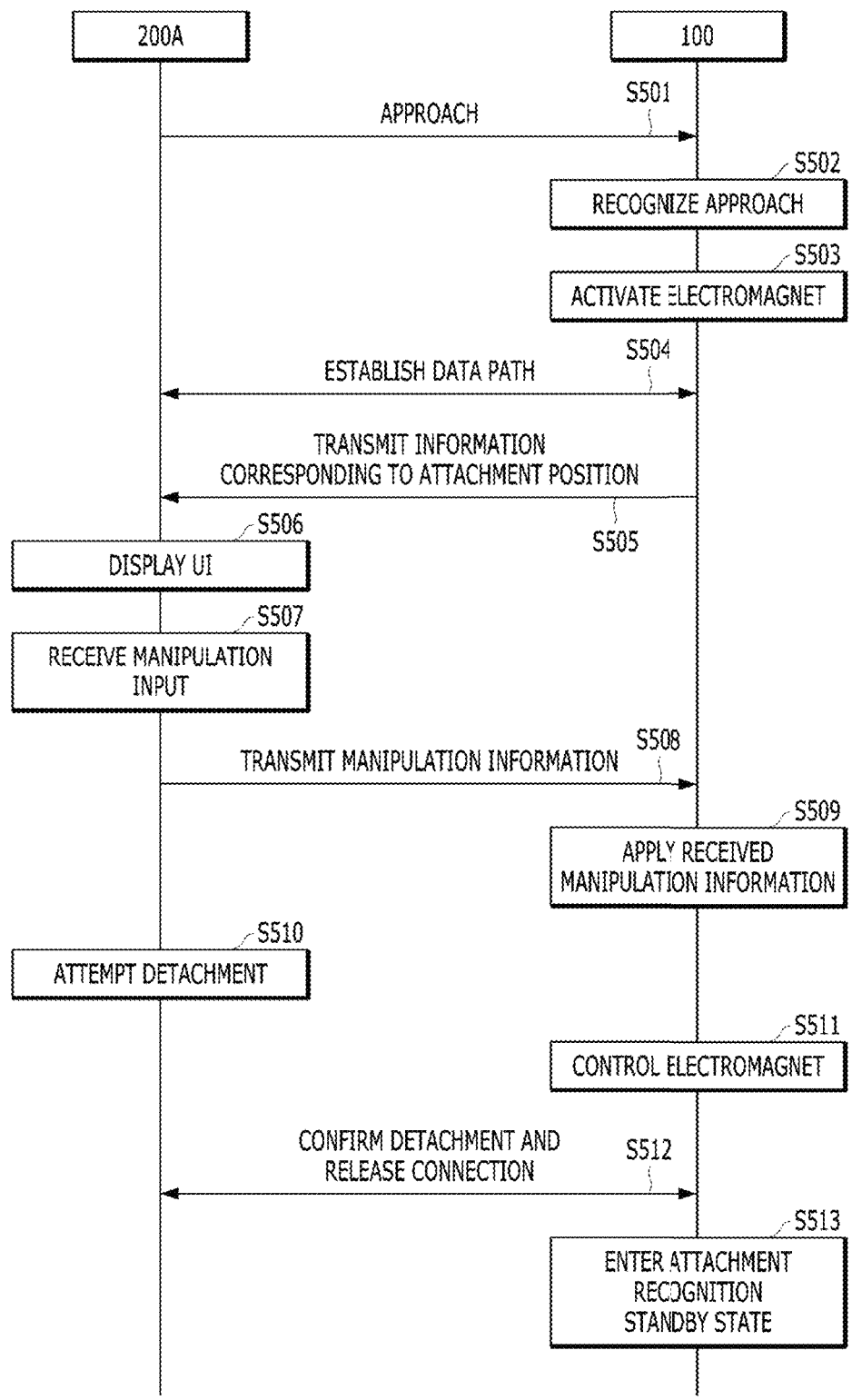
FIG. 5 is a flowchart showing an example of the operation process of the vehicle function control system including the detachable control device according to an embodiment of the present disclosure.

FIG. 5 is a flowchart showing an example of the operation process of the vehicle function control system including the detachable control device according to an embodiment of the present disclosure.

Referring to FIG. 5, the integrated control unit 100 may be in an attachment recognition standby state, and may monitor whether the detachable control device is attached thereto. This state may be activated when the detachable control device 200A is attached to a certain attachment point and is then detached therefrom, may be activated in a specific power state (e.g. ACC), or may be activated when a smart key is sensed in the vehicle. However, the present disclosure is not limited thereto. In addition, in this state, power may start to be applied to the electromagnets of the attachment unit 130, and the other detection units, for example the touch controller and the NFC module, may be activated.

As the detachable control device 200A approaches any one of one or more attachment positions on the attachment unit 130 (S501), the integrated control unit 100 may recognize the approach of the detachable control device 200A through the attachment unit 130 (S502), and may activate the electromagnet disposed at the recognized attachment position (portion) (S503). Accordingly, the detachable control device 200A may be secured at the attachment position on the attachment unit 130.

In addition, the integrated control unit 100 may establish a data path with the detachable control device 200A through the wireless transceiver 150 (S504). For example, the integrated control unit 100 may read the tag of the detachable control device 200A using the NFC reader, and may attempt to wirelessly communicate with the detachable control device 200A using wireless connection information (e.g., Bluetooth ID or connection password) included in the tag.

After the data path is established, the integrated control unit 100 may transmit information about a function to be controlled, corresponding to the attachment position at which the detachable control device 200A is attached, through the established data path (S505). At this time, the transmitted information may include a function code and a current function value. For example, in the case in which the function to be controlled corresponding to the attachment position is a function of adjusting the target temperature of the air-conditioning system, a function code corresponding to the temperature adjustment and a currently set target temperature value (e.g., 24 degrees Celsius) may be transmitted.

Accordingly, the detachable control device 200A may display a user interface, which is capable of displaying digits corresponding to the currently set function code, on the display 220 (S506). For example, the currently set target temperature may be displayed as digits on the display 220.

Thereafter, when a manipulation input is received (S507), for example, when the dial 210 is manipulated, the detachable control device 200A may transmit manipulation information to the integrated control unit 100 through the established data path (S508). For example, when a manipulation input is received in a manner such that the dial 210 is rotated, the manipulation information may include information about the rotation direction and the degree of rotation of the dial 210 (e.g., the "+" direction and step "2").

The integrated control unit 100 may apply the received manipulation information to the corresponding, function (S509). For example, when the attachment position of the detachable control device 200A corresponds to the function of adjusting the temperature of the air-conditioning system and the manipulation information corresponds to the step "+2", the integrated control unit 100 may control the target temperature of the air-conditioning system to be increased by 2 degrees Celsius.

When an occupant in the vehicle attempts to detach the detachable control device 200A from the attachment position by, for example, applying, pulling force to the same (S510), the integrated control unit 100 may recognize this attempt by detecting a change in the magnetic force of the electromagnet disposed at the attachment unit 130 and may control the electromagnet such that the magnetic force of the electromagnet is reduced in order to facilitate detachment of the detachable control device 200A (S511).

Thereafter, when the detachable control device 200A is no longer sensed by the attachment unit 130, the integrated control unit 100 may release the wireless communication with the detachable control device 200A (S512), and may again enter the attachment recognition standby state (S513).

Next, the operation process performed when another detachable control device 200B is stacked on the detachable control device 200A which is already attached onto the attachment unit 30 of the integrated control unit 100, as shown in the drawing on the right in FIG. 4, is described with reference to FIG. 6.

Figure 6:
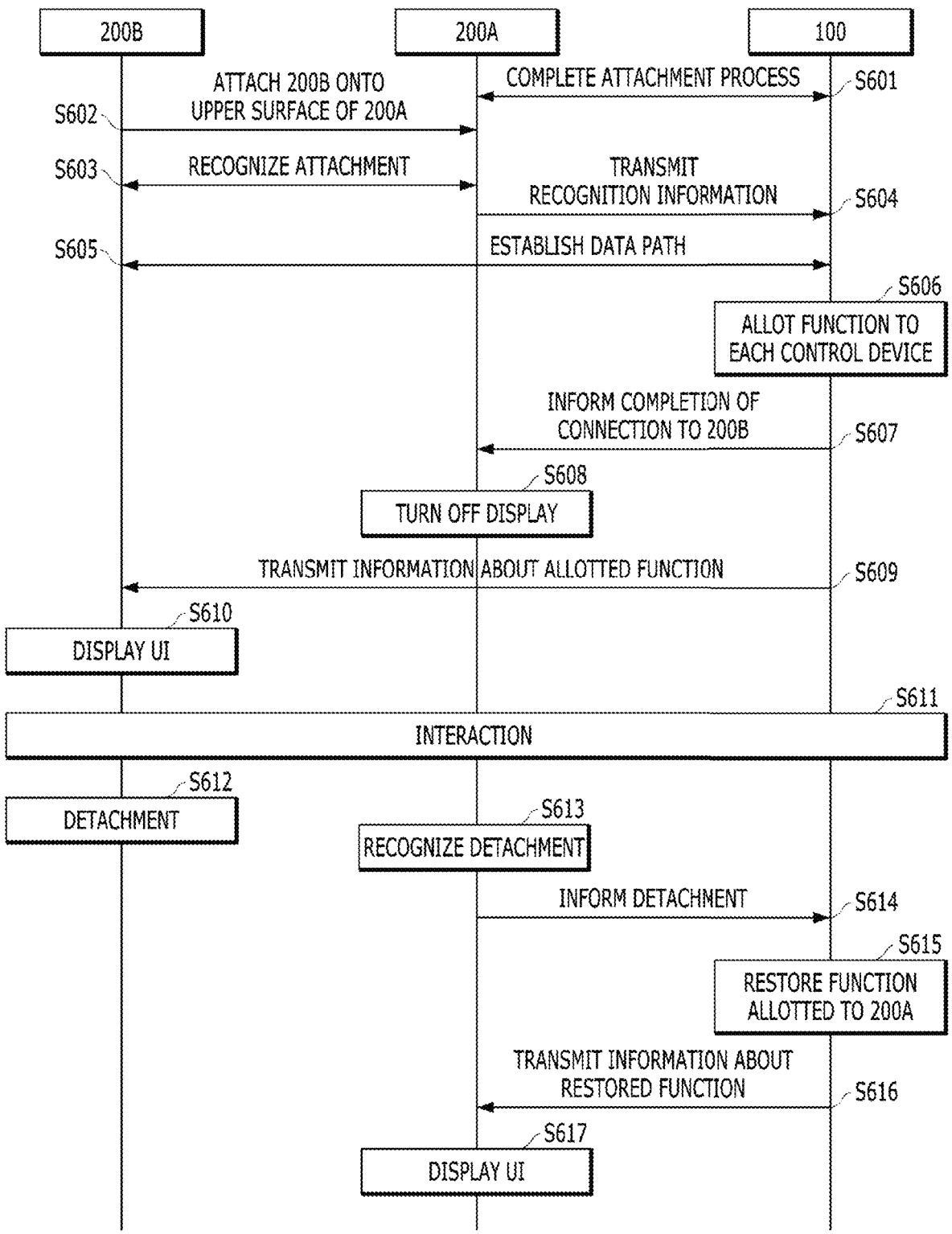
FIG. 6 is a flowchart showing an example of the operation process performed when the detachable control devices are stacked on each other in the vehicle function control system according to an embodiment of the present disclosure.

FIG. 6 is a flowchart showing an example of the operation process performed when the detachable control devices are stacked on each other in the vehicle function control system according to an embodiment of the present disclosure.

Referring to FIG. 6, the process of attaching one detachable control device 200A, which corresponds to steps S501 to S506 in FIG. 5, may be completed (S601).

Thereafter, another detachable control device 200B may be attached to the upper surface of the detachable control device 200A, which already attached onto the attachment unit 130 of the integrated control unit 100 (S602).

Accordingly, the two detachable control devices 200A and 200B may recognize the attachment state therebetween (S603). For example, the lower detachable control device 200A may read the NFC tag of the upper detachable control device 200B to determine attachment or detachment and to acquire recognition information on the upper detachable control device 200B. However, the present disclosure is not limited thereto. At this time, the recognition information may include intrinsic identification information and wireless connection information on the upper detachable control device 200B.

The lower detachable control device 200A may transmit the recognition information to the integrated control unit 100 (S604), and the integrated control unit 100 may establish a data path using the acquired recognition information on the upper detachable control device 200B (S605). To this end, the transceiver 150 of the integrated control unit 100 may be configured as to simultaneously communicate with the two detachable control devices 200A and 200B (e.g., through multi-channel communication or a plurality of BT modules).

After the data path is established, the integrated control unit 100 may differently allot a function to be controlled corresponding to the same attachment position to the two detachable control devices (S606). For example, in the case in which the function to be controlled corresponding to the corresponding attachment position is an air-conditioning function, the integrated control unit 100 may allot a function of adjusting the air volume to the lower detachable control device 200A, and may allot a function of adjusting the target temperature to the upper detachable control device 200B.

Of course, in the case in which a function to be controlled corresponding to the corresponding attachment position is one fixed function, the integrated control unit 100 may identically allot the function to be controlled to the two detachable control devices, or may allot the function to be controlled only to any one of the two detachable control devices (e.g. the upper detachable control device).

Thereafter, the integrated control unit 100 may transmit information, indicating completion of connection to the upper detachable control device 200B, to the lower detachable control device 200A (S607), and the lower detachable control device 200A may turn off the display thereof (S608) in order to prevent unnecessary consumption of power. The reason for this that the display of the lower detachable control device 200A is hidden by the upper detachable control device 200B, which is stacked thereon.

In addition, the integrated control unit 100 may transmit information about the allotted function to the upper detachable control device 200B through the established data path (S609), and the upper detachable control device 200B may output a user interface corresponding to the information about the allotted function to the display (S610). Step 609 and step 610 respectively correspond to step S505 and step S506 in FIG. 5, and thus a duplicate description thereof is omitted in the present disclosure.

The processes of steps S608 to S610 are described in more detail with reference to FIG. 7.

Figure 7:
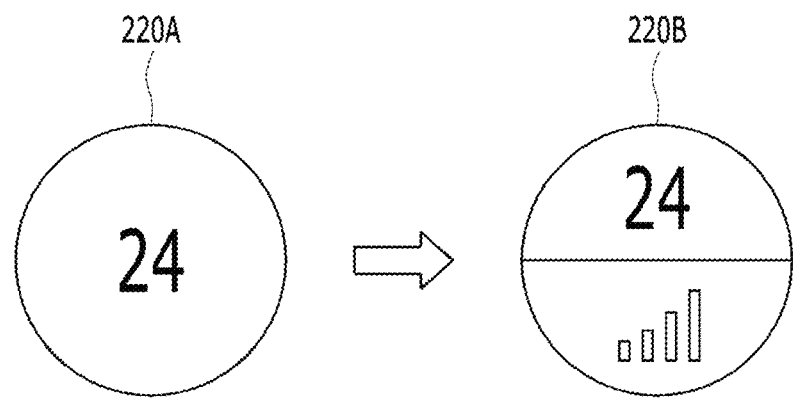
FIG. 7 is a view for explaining a change in the user interface in response to stacking of the detachable control devices according to an embodiment of the present disclosure.

FIG. 7 is a view for explaining a change in the user interface in response to stacking of the detachable control devices according to an embodiment of the present disclosure.

Referring to the drawing on the left in FIG. 7, before the upper detachable control device 200B is attached thereto, the display 220A of the lower detachable control device 200A may display information about the target temperature of the air-conditioning system. In this state, if the upper detachable control device 200B is attached thereto, the display 220A of the lower detachable control device 200A is turned off, and the upper detachable control device 200B may display a user interface (UI) corresponding to the function allotted thereto (S606) on the display 220B. For example, as shown in the drawing on the right in FIG. 7, a target temperature allotted to the upper detachable control device 200B is displayed on the upper portion of the display 220B of the upper detachable control device 200B, and an air volume allotted to the lower detachable control device 200A is displayed on the lower portion of the display 220B of the upper detachable control device 200B.

In this way, an occupant in the vehicle is capable of increasing the number of different kinds of functions to be controlled as the occupant desires.

Referring again to FIG. 6, when the user manipulates at least one of the upper detachable control device 200B or the lower detachable control device 200A, an interaction may occur such that the manipulation information is transmitted to the integrated control unit 100 and a function to be controlled corresponding to the manipulation information is performed (S611). This process corresponds to steps S507 to S509 in FIG. 5, and thus a duplicate description thereof is omitted.

Meanwhile, when the upper detachable control device 200B is detached therefrom (S612), the lower detachable control device 200A may recognize the detachment of the upper detachable control device 200B due to interruption of the NFC connection (S613). Accordingly, the lower detachable control device 200A may transmit information indicating the detachment to the integrated control unit 100 (S614), and when a change in the function allotted to the lower detachable control device 200A was made in step S606, the integrated control unit 100 may restore the function (S615), and may transmit information about the restored function to the lower detachable control device 200A (S616). Accordingly, the lower detachable control device 200A may again activate the display to display the user interface (S617).

When receiving information about the detachment, the integrated control unit 100 may release the wireless connection to the upper detachable control device 200B, which is detached from the lower detachable control device 200A.

In the embodiment shown in FIG. 6, it has been described that the integrated control unit 100 establishes separate wireless connection to each of the detachable control devices 200A and 200B, but the present disclosure is not limited thereto. For example, the integrated control unit 100 may establish wireless communication connection only to the detachable control device 200A that is attached thereto first, and the detachable control device 200A may serve to relay data exchange between the remaining detachable control device 200B and the integrated control unit 100.

On the other hand, in the case in which the stacked assembly of the detachable control devices shown in the drawing on the right in FIG. 3 is attached to the attachment unit 130 of the integrated control unit 100, the lowermost detachable control device 200A may collect recognition information about the remaining detachable control devices 200B and 200C stacked thereon, and then may transmit the same to the integrated control unit 100.

If still another detachable control device 200C is stacked after completion of step S610 or step S611 in FIG. 6, the process corresponding to step S603 may be performed between the intermediate detachable control device 200B and the uppermost detachable control device 200C. Thereafter, the intermediate detachable control device 200B may transmit recognition information about the uppermost detachable control device 200C to the integrated control unit 100 through the pre-established data path, thereby establishing a data path between the uppermost detachable control device 200C and the integrated control unit 100.

Meanwhile, in the stacked state, the detachable control devices may share power through a wireless charging scheme therebetween, and two or more detachable control devices may be charged at the same time through the integrated control unit 100.

Hereinafter, functions that can be performed through control of the electromagnets disposed at the attachment unit 130 of the integrated control unit 100 are described with reference to FIGS. 8 to 12.

Figure 8:
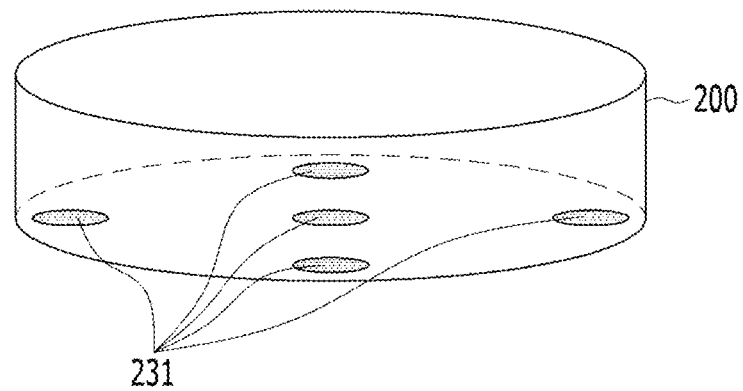
FIG. 8 shows an example or the configuration of an attachment unit of an integrated control unit according to an embodiment of the present disclosure.

FIG. 8 shows an example of the configuration of the attachment unit of the integrated control unit according to an embodiment of the present disclosure.

Referring to FIG. 8, the attachment unit 230 of the detachable control device 200 has an attachment means corresponding to the configuration of the attachment unit 130 of the integrated control unit 100. As the attachment means, a plurality of magnetic bodies 231 is disposed on the bottom surface (the outer bottom surface or the inner bottom surface) of the detachable control device 200 so as to form a predetermined pattern. The detachable control device 200 including the attachment unit 230 having the above configuration may be automatically movable through control of the attachment unit 130 of the integrated control unit 100.

Figure 9:
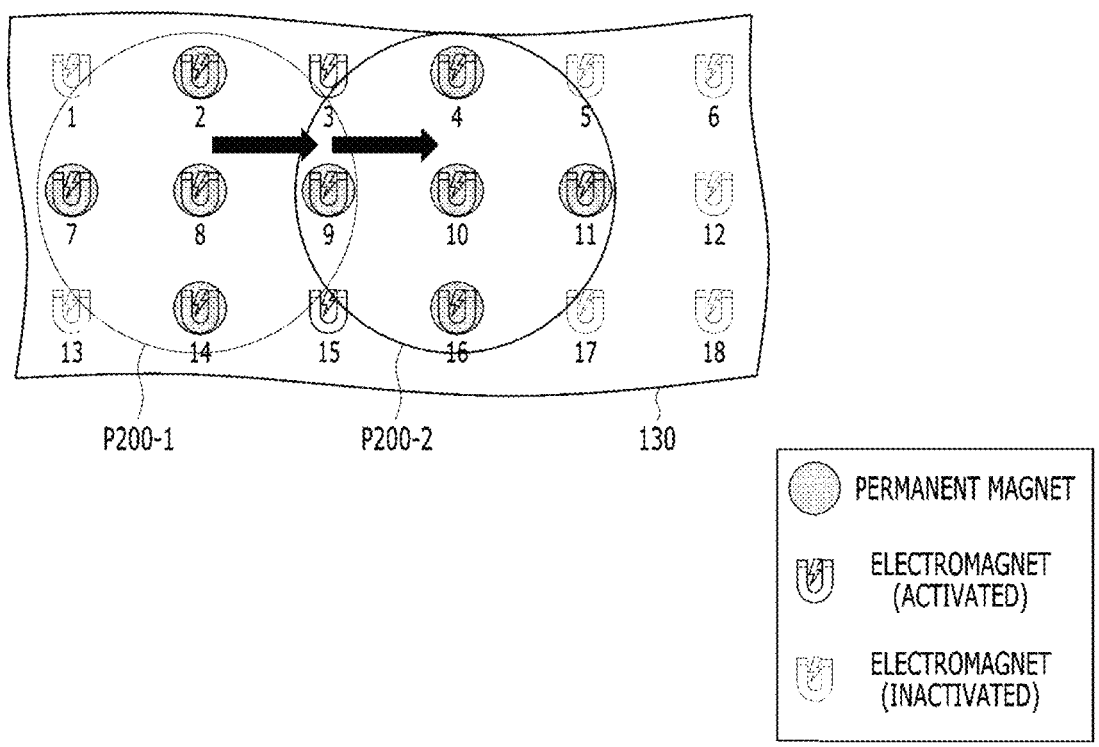
FIGS. 9, 10A, 10B, 10C show an example of the configuration for automatically moving the detachable control device in the attachment unit according to an embodiment of the present disclosure.

FIGS. 9 and 10 show an example of the configuration for automatically moving: the detachable control device in the attachment unit according to an embodiment of the present disclosure.

Referring to FIG. 9, the attachment unit 130 of the integrated control unit 100 may include a plurality of electromagnets 1 to 18 arranged in the form of a grid other words, the attachment unit 130 shown in FIG. 9 includes 18 electromagnets corresponding to a 3×6 grid. However, this is merely illustrative, and in some embodiments, the attachment unit 130 may include a greater or smaller number of electromagnets than 18 electromagnets.

Here, the activation and polarities of the electromagnets 1 to 18 may be determined in consideration of the arrangement pattern of the magnetic bodies 231 of the detachable control device 200. For example, in the case in which the magnetic bodies 231 of the detachable control device 200 form a "+" pattern, as shown in FIG. 8, and are permanent magnets having the same first polarity toward the attachment unit 130, the electromagnets disposed at the attachment unit 130 of the integrated control unit 100 may also form a "+" pattern as a basic activation unit. The electromagnets included in the basic activation unit may be activated so as to have a second polarity, which is opposite the first polarity, toward the bottom surface of the detachable control device 200.

Specifically, the electromagnets 2, 7, 8, 9 and 14 may correspond to a basic activation unit of the leftmost attachment position P200-1 of the attachment unit 130, centered on the electromagnet 8. In addition, the electromagnets 3, 8, 9, 10 and 15 may correspond to a basic activation unit of a second attachment position from the left, centered on the electromagnet 9. Furthermore, the electromagnets 4, 9, 10, 11 and 16 may correspond to a basic activation unit of a third attachment position P200-2 from the left, centered on the electromagnet 10.

Consequently, in the case in which the detachable control device 200 including the magnetic bodies 231 arranged as shown in FIG. 8 is attached to the leftmost attachment position P200-1 and is then moved to the third attachment position P200-2 from the left, the magnetic bodies 231 may be located on electromagnets that are activated to have the opposite polarity at the second attachment position from the left, centered on the electromagnet 9, and thus the user may experience a sensation of the detachable control device 200 catching thereat. As a result, the user may feel movement of the detachable control device between the attachment positions through movement having a distinct tactile sensation, without visual confirmation.

In the case in which the attachment the detachable control device 200 to an arbitrary attachment position is recognizing through an attachment recognition means and then the recognition of the detachable control device 200 at the corresponding attachment position fails, the controller 260 may determine that this is movement of the detachable control device 200 between the attachment positions, and may reduce the magnetic force of each activated electromagnet by a predetermined rate for smooth movement of the detachable control device 200 between the attachment positions.

Also, in the case in which the number of functions to be controlled that are displayed on the display 120 is three, at that time, only basic activation units corresponding to three different attachment positions are activated, and the other electromagnets may be inactivated, as shown in FIG. 9. In the case in which the number of functions to be controlled is four, the electromagnets 10, 11, 12 and 17, corresponding to the activation unit centered on the electromagnet 11, may be further activated.

Furthermore, electromagnets that do not correspond to the activation units may be activated so as to have a polarity opposite the polarity of the activated electromagnets (i.e. a polarity identical to the polarity the permanent magnets of the detachable control device), rather than being inactivated. For example, in the case in which the electromagnets 1, 5, 13 and 17 are activated so as to have the opposite polarity in FIG. 9, repulsive force may be generated between these electromagnets and the permanent magnets of the detachable control device 200. Thus, in the case in which the user attempts to move the detachable control device 200 from the leftmost attachment position P200-1 to the left, a repulsive force may be generated and thus the user may easily perceive that the user attempts to move the detachable control device in the wrong direction. In some embodiments, the electromagnets located at the corners (e.g. the electromagnets 1, 6, 13 and 18) may be constantly activated so as to have a polarity opposite the polarity of the electromagnets corresponding to the activation units, irrespective of the number of functions displayed on the display 120 or the activation units.

In another form, the magnitude of the magnetic force generated between the magnetic bodies 231 of the detachable control device 200 and the electromagnets provided at the attachment unit 130 of the integrated control unit 100 is greater than the rotational resistance of the dial 210 and sufficient to prevent the detachable control device 200, which is attached at an arbitrary attachment position, from becoming detached therefrom due to vibration that generally occurs during driving of the vehicle. If the magnitude of magnetic force is less than the rotational resistance, this is problematic in that, when the user rotates the dial 210, the entire detachable control device 200 may be rotated, without movement of the dial 210.

It should be apparent to those having ordinary skill in the art that the magnitude of magnetic force may be variously changed depending on the weight of the detachable control device 200, the angle between the position at which the detachable control device 200 is attached in the vehicle and the vertical direction, and the rotational resistance of the dial 210.

In the embodiment described above with reference to FIG. 9, the method of providing feedback between movements, assisting movement, or inhibiting movement in the state in which the user directly moves the detachable control device 200 has been described. In another embodiment, the electromagnets of the attachment unit may be controlled to automatically move the detachable control device 200. This is described with reference to FIGS. 10A, 10B and 10C.

Figure 10A:
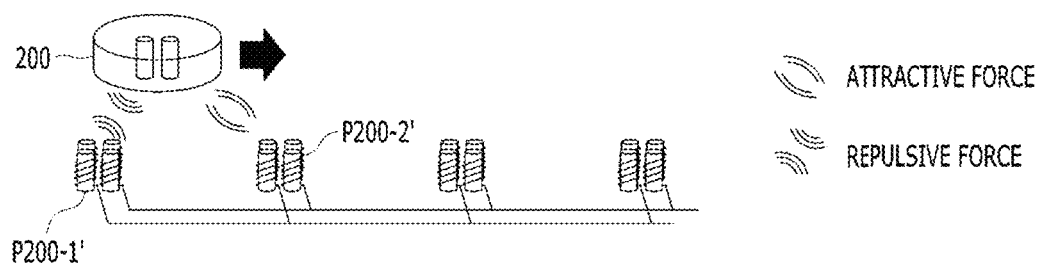
Figure 10B:
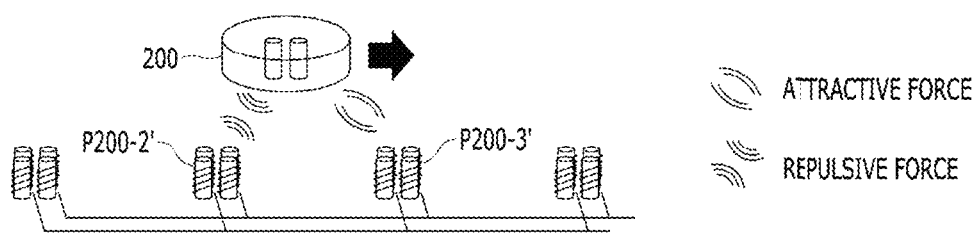
Figure 10C:
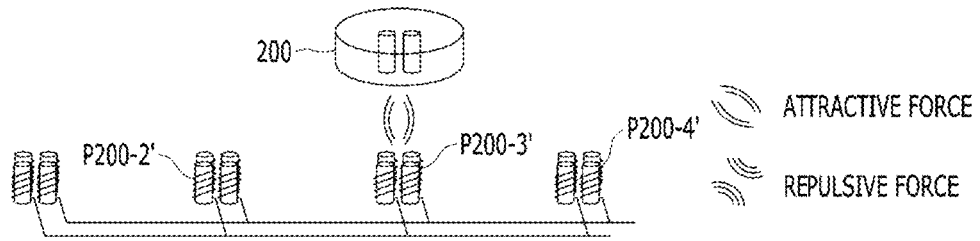

In FIGS. 10A, 10B and 10C, individual attachment positions are shown as electromagnet units for easy understanding, and it is assumed that the detachable control device 200 is automatically moved in the rightward direction from the leftmost attachment position P200-1' to a third attachment position P200-3' from the left. In this case, automatic movement may be performed using a method of alternately changing the polarities of the electromagnets adjacent to the detachable control device 200 in the target movement direction of the detachable control device 200.

Specifically, referring to FIG. 10A, in order to move the detachable control device to the right in the state in which the detachable control device 200 is disposed at the leftmost attachment position P200-1' electromagnets corresponding to the leftmost attachment position P200-1' may be controlled to generate repulsive force with respect to the detachable control device 200, and electromagnets corresponding to a second attachment position P200-2' from the left may be controlled to generate attractive force with respect to the detachable control device 200.

Subsequently, when the detachable control device 200 passes by the second attachment position P200-2' from the left, as shown in FIG. 10B, the electromagnets corresponding to the second attachment position P200-2' from the left may be controlled to generate repulsive force with respect to the detachable control device 200, and electromagnets corresponding to a third attachment position P200-3' from the left may be controlled to generate attractive force with respect to the detachable control device 200.

As a result, when the detachable control device 200 reaches the third attachment position P200-3' from the left, i.e. the target position, as shown in FIG. 10C, the electromagnets of the attachment positions P200-2' and P200-4' adjacent to the target position may be inactivated, and only the electromagnets corresponding to the third attachment position P200-3' may be controlled to generate attractive force with respect to the detachable control device 200. Of course, in order to prevent further movement and to achieve more secure fixation, the electromagnets of the attachment positions P200-2' and P200-4' adjacent to the target position may be controlled to generate repulsive force with respect to the detachable control device 200.

A function that can be realized through the above-described automatic movement function is described with reference to FIGS. 11A, 11B, 11C and 11D.

FIG. FIGS. 11A, 11B, 11C and 11D are views showing an example of a function that can be realized through the automatic movement function described with reference to FIGS. 9 and 10.

Figure 11A:
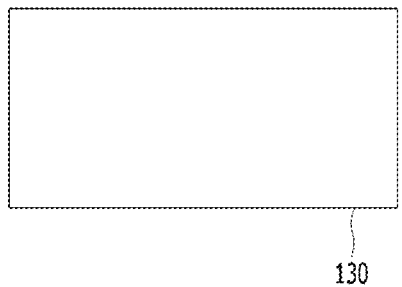
FIGS. 11A, 11D, 11C, 11D are views showing an example of a function that can be realized through the automatic movement function described with reference to FIGS. 9, 10A, 10B, 10C.
Figure 11B:
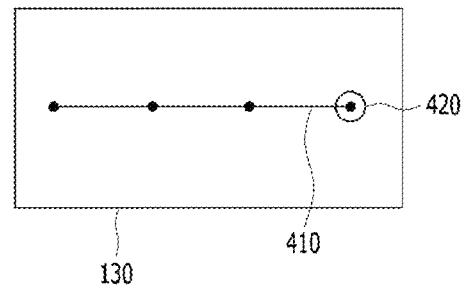

Referring first to FIG. 11A, the attachment unit 130 of the integrated control unit 100 remains inactivated in the state in which the vehicle is stalled. When the vehicle is started, the attachment unit 130 may be activated. Specifically, as shown in FIG. 11B, attachment positions to which the detachable control device 200 can be attached may be displayed as point light sources 420, and an automatic movement path of the detachable control device 200 may be displayed as a line light source 410 interconnecting the point light sources 420.

Figure 11C:
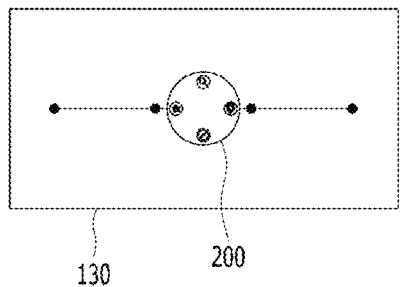
Figure 11D:
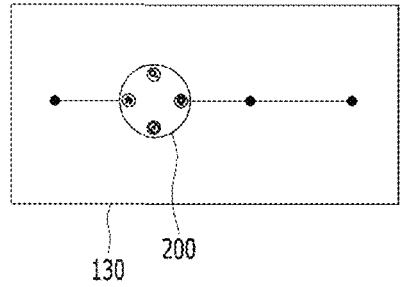
Figure 12A:
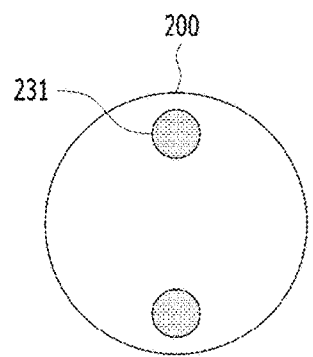
FIGS. 12A to 12E show examples of the arrangement pattern of magnetic bodies for securing the detachable control device according to an embodiment of the present disclosure.
Figure 12B:
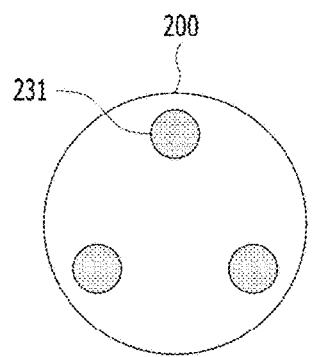
Figure 12C:
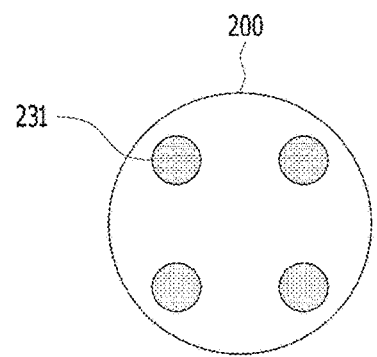
Figure 12D:
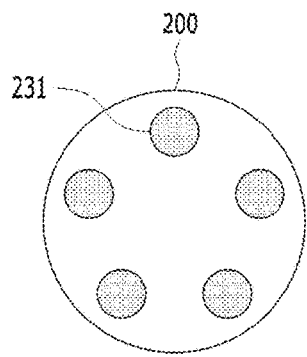
Figure 12E:
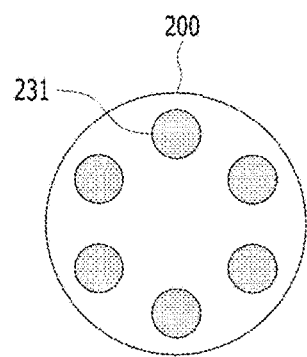

At this time, in the case in which the user attaches the detachable control device 200 to an arbitrary position on the attachment unit 130, as shown in FIG. 11C, the integrated control unit 100 may sense the position of the detachable control device 200. The integrated control unit 100 may also automatically move the detachable control device 200 to an attachment position set as a default, as shown in FIG. 11D. The set default attachment position may correspond to a function that is most frequently used, may correspond to a function that is selected by the user through predetermined menu manipulation, or may be an attachment position at which the detachable control device 200 was located last before the vehicle was stalled at the end of the previous trip. However, the present disclosure is not limited thereto. When the driver inputs a speech command in this state, the detachable control device 200 may be automatically moved to an attachment position corresponding to a function corresponding to the speech command.

Meanwhile, the arrangement pattern of the magnetic bodies 231 shown in FIGS. 8 and 9 is merely illustrative, and the arrangement pattern of the magnetic bodies 231 may be variously changed. This is described below with reference to FIGS. 12A to 17F.

FIGS. 12A to 12E show examples of the arrangement pattern of the magnetic bodies for securing the detachable control device according to an embodiment of the present disclosure.

Ire FIGS. 12A to 12E, a large circle 200, which corresponds to the planar shape of the detachable control device 200, indicates the attachment position of the detachable control device 200, and small circles 231 indicate the disposition positions of the magnetic bodies.

In one form, two or more magnetic bodies 231 are provided such that the detachable control device 200 is not capable of being rotated by manipulation of the dial 210 after the detachable control device 200 is attached. In addition, the magnetic bodies 231 may be arranged about the center of the attachment position in origin symmetry. The reason for this is to assist the detachable control device 200 to be accurately attached to the attachment position when the detachable control device 200 approaches the attachment position. Of course, the points at which the electromagnets are disposed, in the attachment position provided at the attachment unit 130 of the integrated control unit 100, and the number of electromagnets may be variously changed in consideration of the arrangement pattern of the magnetic bodies 231 of the detachable control device 200.

Hereinafter, a method whereby the attachment unit 130 of the integrated control unit 100 recognizes attachment or detachment of the detachable control device 200 is described. In the following description, it is assumed that the attachment unit 130 of the integrated control unit 100 has a recognition means and that the attachment unit 230 of the detachable control device 200 has a means to be recognized.

A conductor may be disposed at the center of the bottom surface of the detachable control device 200, and a capacitance sensor for sensing a change in capacitance due to approach of the conductor may be provided at each attachment position of the attachment unit 130 of the integrated control unit 100. In this case, a touch controller may be disposed at the attachment unit 130 to inform the controller 160 of an attachment position where the sensing value of the capacitance sensor changes.

In another method, a light-emitting device for emitting light in a specific pattern under the control of the controller 260 may be disposed at the center of the bottom surface of the detachable control device 200, and a light-receiving device for recognizing the light emission pattern of the light-emitting device may be provided at each attachment position of the attachment unit 130 of the integrated control unit 100. In this case, the attachment or detachment of the detachable control device 200 and the attachment position thereof may be determined through recognition of the light emission pattern.

In still another method, a Hall sensor may be provided at each attachment position in order to sense the magnetic bodes 231 of the detachable control device 200. Thus, the attachment position of the detachable control device 200 may be determined.

In addition, a wireless charging receiver may be provided at the detachable control device 200, and a wireless charging transmitter may be provided at each attachment position of the attachment unit 130 of the integrated control unit 100, whereby the detachable control device 200 may receive power via wireless charging. As a result, the integrated control unit 100 may determine an attachment position at which the detachable control device 200 is attached based on the position of the activated wireless charging transmitter.

Hereinafter, the external appearance of the attachment unit 130 of the integrated control unit 100 is described with reference to FIGS. 13 and 14.

Figure 13:
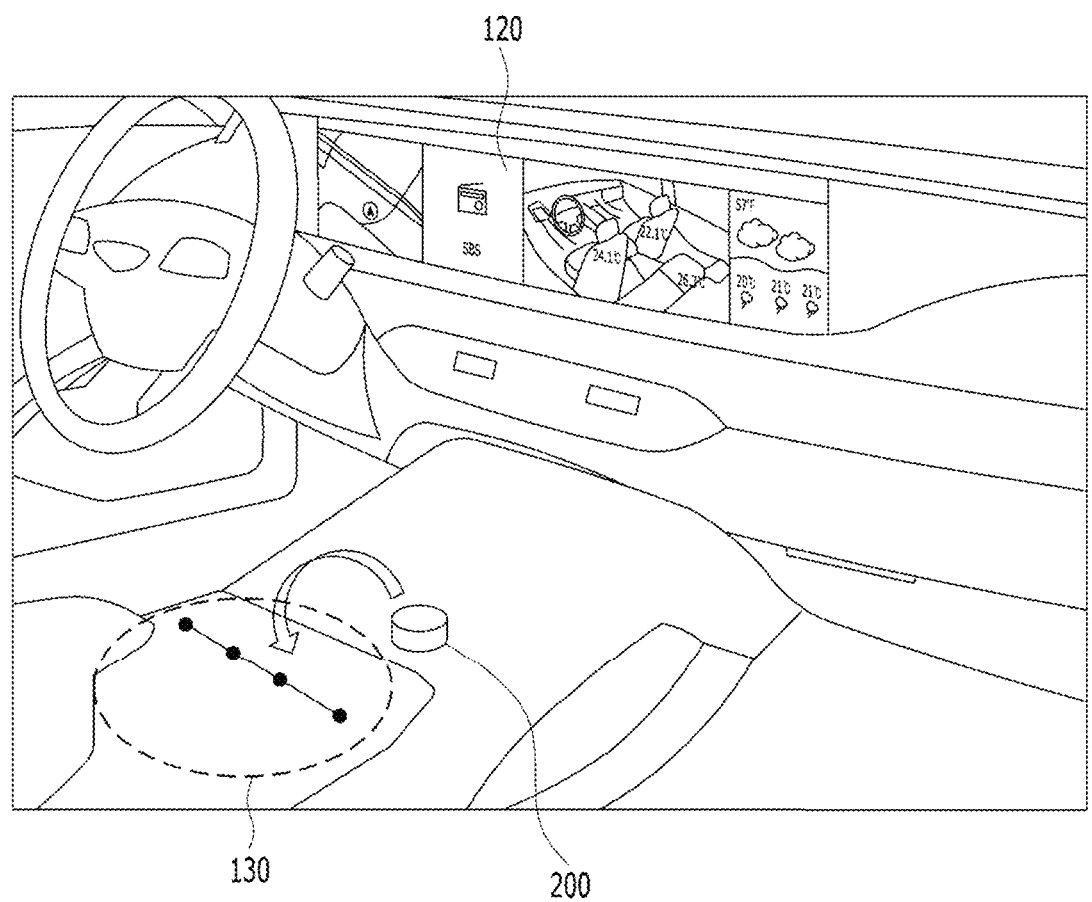
FIG. 13 shows an example of the external appearance the attachment unit of the integrated control unit according to an embodiment of the present disclosure.
Figure 14A:
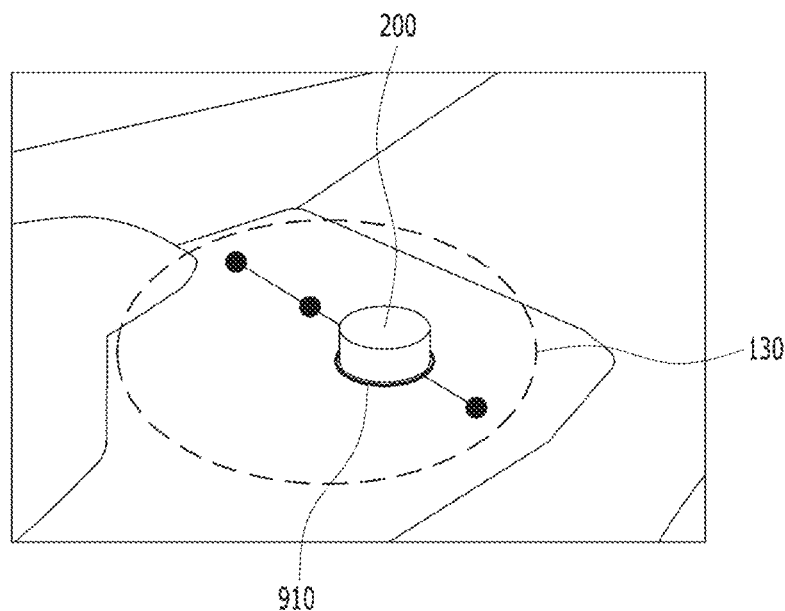
FIGS. 14A and 14B show examples of the state in which the detachable control device is attached to one of the attachment positions shown in FIG. 13.
Figure 14B:
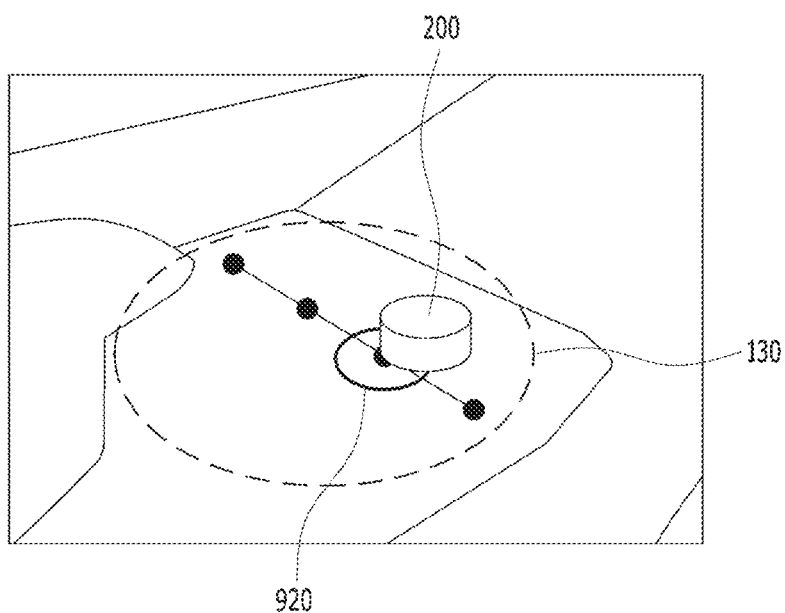

FIG. 13 shows an example of the external appearance of the attachment unit of the integrated control unit according to an embodiment of the present disclosure, and FIG. 14 shows an example of the state in which the detachable control device is attached to one of the attachment positions shown in FIG. 13. In FIGS. 13, 14A and 14B, is assumed that a total of four attachment positions is provided at the attachment unit 130 of the integrated control unit 100.

Referring to FIG. 13, in the case in which a display 120 extending from a cluster to a center fascia area in the horizontal direction is applied to the vehicle, the attachment unit 130 of the integrated control unit 100 may be provided in a center console area such that the attachment positions thereof are also disposed in a line in the horizontal direction. In this case, a point light source ray be disposed at each attachment position such that the driver can intuitively recognize the same, and a line light source may be disposed between neighboring ones of the point light sources. Consequently, the driver may attach the detachable control device 200 to any one of the point light sources.

When the detachable control device 200 is attached to a third attachment point from the left, as shown in FIG. 14A, at least one of the light emission range or the light emission intensity of the point light source at the corresponding position may be controlled such that a ring-shaped light emission effect 910 may be provided around the bottom surface of the attached detachable control device 200.

As shown in FIG. 14B, in the case in which the detachable control device 200 deviates from the correct attachment position thereof, for example, in the case in which the signal sensitivity of the attachment recognition means described above is equal to or less than a predetermined level, the point light source corresponding to the corresponding attachment position may output a light emission effect 920 different from that shown in FIG. 14A in terms of at least one of color or shape, thereby informing the driver of the attachment position deviation state. Of course, the detachable control device 200 may be automatically moved to the attachment position closest thereto through the automatic movement function described above with reference to FIGS. 9 and 10.

Meanwhile, although it is illustrated in FIGS. 13, 14A and 14B that the plurality of attachment positions is aligned in a line in the horizontal direction, the alignment form of the plurality of attachment positions may be changed depending on the display 120.

Figure 15A:
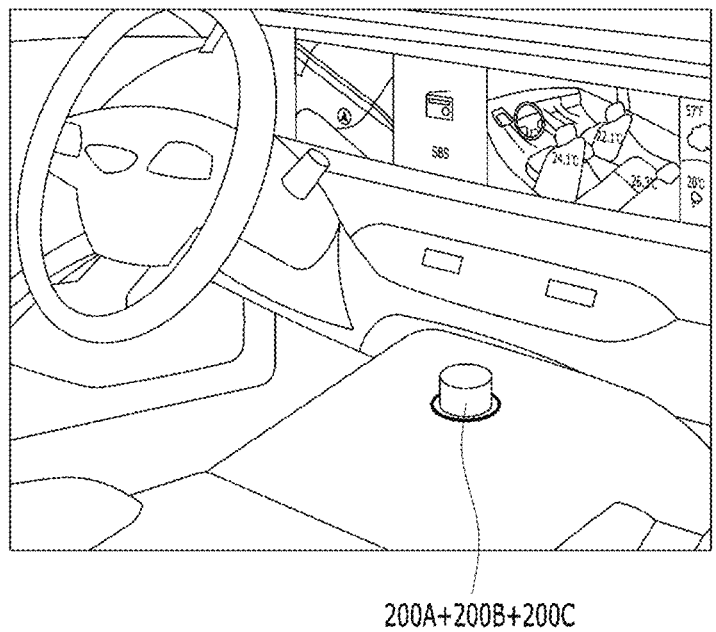
FIGS. 15A and 15B show examples of the usage form of a plurality of detachable control devices according to an embodiment or the present disclosure.
Figure 15B:
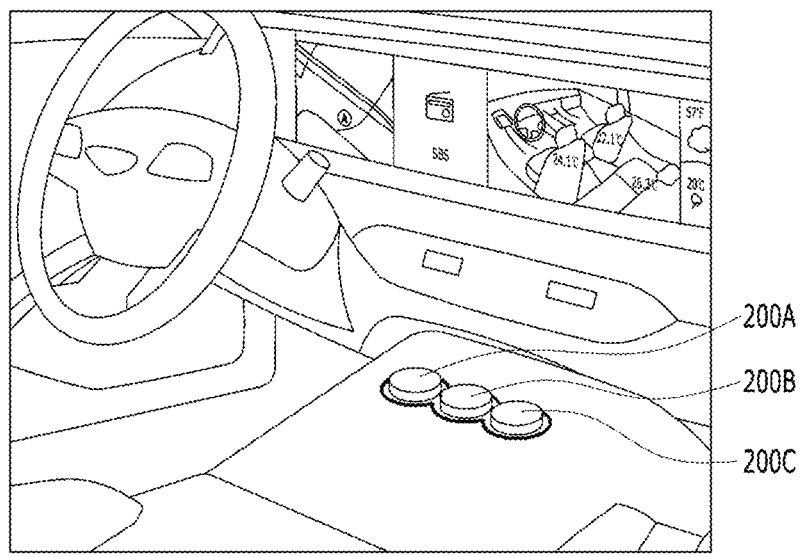

FIGS. 15A and 15B show examples of the usage form of a plurality of detachable control devices according to an embodiment of the present disclosure.

As shown in FIG. 15A, a plurality of detachable control devices 200A, 200B and 200C may be stacked, and the stacked assembly thereof may be attached at one attachment position. Alternatively, as shown in FIG. 15B, the plurality of detachable control devices 200A, 200B and 200C may simultaneously be disposed at respective ones of the attachment positions. In other words, in the state shown in FIG. 15A, a plurality of sub-functions of one function to be controlled may be controlled, and in the state shown in FIG. 15B, a plurality of functions to be controlled may be conveniently controlled.

In the above embodiment, the detachable control device 200 has been described as interworking with the display 120 of the integrated control unit 100. However, the present disclosure is not limited thereto. The detachable control device 200 may be attached around a touch panel having no display function in order to constitute a control device for the vehicle together with the touch panel.

Meanwhile, in the embodiments described above, the description has been given based on the driver's manipulation environment, such as the center console or the center fascia. In another embodiment of the present disclosure, however, the use of the detachable control device by a passenger sitting in the front passenger seat or in the back seat may also be considered. This is described with reference to FIG. 16.

Figure 16:
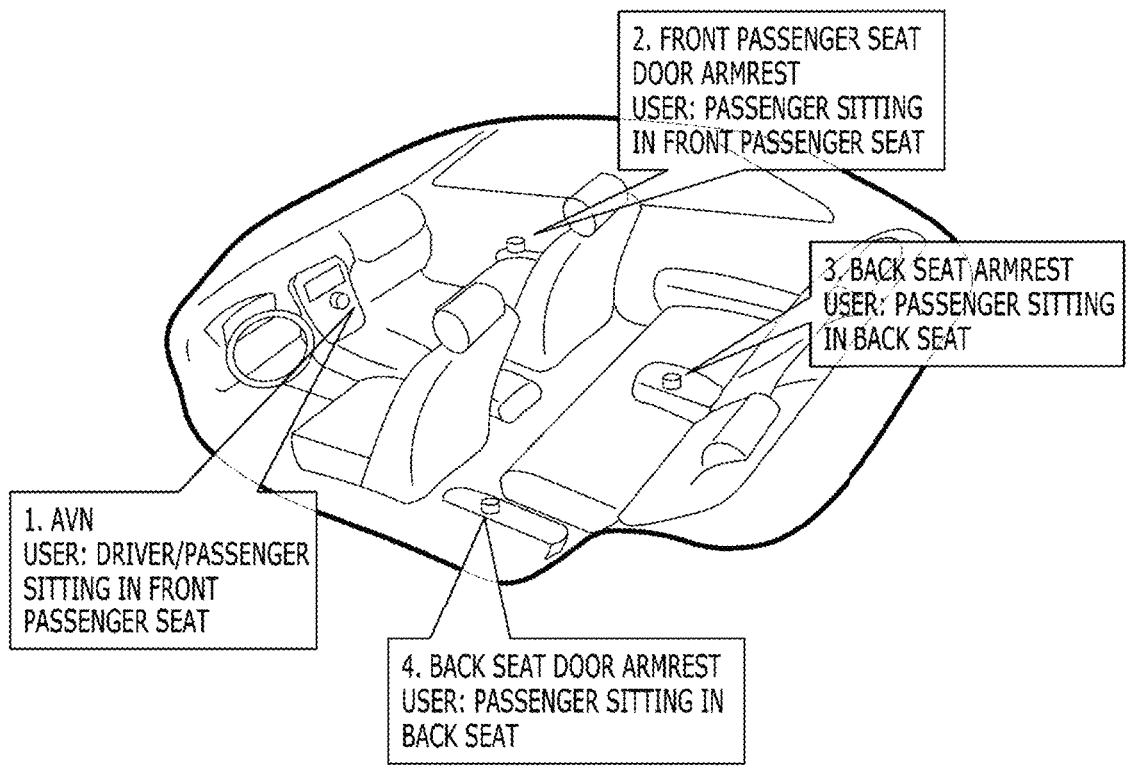
FIG. 16 shows an example of an in-vehicle position of the attachment unit according to another embodiment of the present disclosure.

FIG. 16 shows an example of an in vehicle position of the attachment unit according to another embodiment of the present disclosure.

Referring to FIG. 16, various positions of the attachment unit are shown. First, the periphery 1 of the audio/video/navigation (AVN) system is similar to what has been described with reference to FIG. 13. A front passenger seat door armrest 2 for use of a passenger sitting in the front passenger seat, back seat armrest 3 for use of a passenger sitting in the back seat, and a back seat door armrest 4 for use of a passenger sitting in the back seat may be considered as other positions for the attachment unit.

In the case in which attachment units are disposed at two or more different positions, as described above, each of a plurality of detachable control devices may be attached to a respective one of the positions. In the case in which the same detachable control device (e.g., 200A) attached to a new attachment unit, the controller 160 of the integrated control unit 100 may perform control such that the function controlled last at the previous attachment unit can be continuously manipulated at the new attachment unit. For example, in the case in which the detachable control device 200 manipulating the multimedia at the periphery 1 of the AVN system is attached to the back seat armrest 3, the multimedia may be continuously manipulated.

In another embodiment, the controller 160 may perform control such that the function set as a default based on the position of the attachment unit, irrespective of the function controlled last at the previous attachment unit, or the function controlled last at the new attachment unit becomes the function to be controlled.

The vehicle control method using the detachable control device according to the embodiments of the present disclosure described above may have the following effects.

First, freedom in the design of the detachable control device and the in-vehicle control device and intuitive usability thereof may be improved due to a reduction in the number switches. For example, physical key buttons may be simplified due to the detachable control device. In another example, center fascia/floor console switches may be integrated through integration of functions.

In addition, since the detachable control device is attached and detached using magnetic force, usability thereof is improved. In other words, magnetic force is utilized, rather than a mechanical structure for securing the detachable control device to the attachment area, and thus the detachable control device may be simply attached to the attachment area when the detachable control device is brought close to the attachment area, thus improving convenience in use.

In addition, a plurality of detachable control devices may be stacked in order to control a plurality of sub-functions of one function to be controlled, or may be disposed at different respective attachment positions in order to control different respective functions to be controlled.

Furthermore, when the detachable control device is used during driving, it is not necessary to visually confirm the degree of manipulation, which distracts forward attention, due to a manipulation sensation provided by a physical dial.

The present disclosure may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), Read-Only Memory (ROM), Random Access Memory (RLM), Compact Disk ROM (CD-ROM), a magnetic tape, a floppy disc, and an optical data storage.

As is apparent from the above description, a vehicle function control system associated with at least one embodiment of the present disclosure, configured as described above, interworks with a detachable control device, thereby providing a more convenient user interface.

In addition, a function to be controlled and a user interface may be conveniently changed depending on the position at which a detachable control device attached.

In particular, two or more detachable control devices may be stacked on each other, and the stacked assembly thereof may be used for various functions of a vehicle.

However, the effects achievable through the present disclosure are not limited to the above-mentioned effects, and other effects not mentioned herein would be clearly understood by those having ordinary skill in the art from the above description.

It should be apparent to those having ordinary skill in the art that various changes in form and details may be made without departing from the spirit and essential characteristics of the present disclosure set forth herein. Accordingly, the above detailed description is not intended to be construed to limit the present disclosure in all aspects and to be considered by way of example. The scope of the present disclosure should be determined by reasonable interpretation of the appended claims and all equivalent modifications made without departing from the present disclosure should be included in the following claims.

What is claimed is:

1. A method of controlling an integrated control unit, the method comprising:
    recognizing a first detachable control device attached to a first attachment position among at least one attachment position provided at an attachment unit;
    establishing a first data path with the first detachable control device;
    transmitting information about a first function to be controlled corresponding to the first attachment position to the first detachable control device through the first data path;
    upon receiving first manipulation information from the first detachable control device, controlling the first function based on the first manipulation information;
    receiving, through the first data path, recognition information on a second detachable control device which is stacked on the first detachable control device; and
    establishing a second data path with the second detachable control device based on the received recognition information.

2. The method according to claim 1, further comprising:
    when the second data path is established, allotting a first sub-function of the first function to the first detachable control device; and allotting a second sub-function of the first function to the second detachable control device.

3. The method according to claim 2, further comprising:
    transmitting information about the second sub-function to the second detachable control device through the second data path.

4. The method according to claim 3, further comprising:
    upon receiving second manipulation information from the second detachable control device, controlling the second sub-function based on the second manipulation information.

5. The method according to claim 2, further comprising:
    transmitting information indicated of completion of establishment of the second data path to the first detachable control device to turn off a display of the first detachable control device which is hidden by the second detachable control device stacked on the first detachable control device.

6. The method according to claim 5, further comprising:
    receiving, from the first detachable control device, information indicative of detachment of the second detachable control device; and
    restoring a function allotted to the first detachable control device to a function performed before the second detachable control device is stacked.

7. The method according to claim 6, further comprising:
    releasing the second data path; and
    transmitting information about the restored function to the first detachable control device to activate the display of the first detachable control device.

8. The method according to claim 1, further comprising:
    selectively generating an attractive force and a repulsive force between electromagnets of the attachment unit and magnetic bodies of the first detachable control device and the second detachable control device.

9. A non-transitory computer-readable recording medium having a program recorded thereon, the program configured to direct a processor to perform acts of:
    recognizing a first detachable control device attached to a first attachment position among at least one attachment position provided at an attachment unit;
    establishing a first data path with the first detachable control device;
    transmitting information about a first function to be controlled corresponding to the first attachment position to the first detachable control device through the first data path;
    upon receiving first manipulation information from the first detachable control device, controlling the first function based on the first manipulation information;

receiving, through the first data path, recognition information on a second detachable control device which is stacked on the first detachable control device; and establishing a second data path with the second detachable control device based on the received recognition information.

10. A vehicle function control system, comprising:

a wireless transceiver;

an attachment unit comprising at least one attachment position; and a controller configured to:
- when recognizing a first detachable control device attached to a first attachment position among the at least one attachment position, establish a first data path with the first detachable control device using the wireless transceiver,
- transmit information about a first function to be controlled corresponding to the first attachment position to the first detachable control device through the first data path, and
- when receiving first manipulation information from the first detachable control device, control the first function based on the first manipulation information, wherein, when receiving, through the first data path, recognition information on a second detachable control device which is stacked on the first detachable control device, the controller is configured to establish a second data path with the second detachable control device based on the received recognition information.

11. The vehicle function control system according to claim 10, wherein, when the second data path is established, the controller is configured to: allot a first sub-function of the first function the first detachable control device, and allot a second sub-function of the first function to the second detachable control device.

12. The vehicle function control system according to claim 11, wherein the controller is configured to cause information about the second sub-function to be transmitted to the second detachable control device through the second data path.

13. The vehicle function control system according to claim 12, wherein, when receiving second manipulation information from the second detachable control device, the controller is configured to control the second sub-function based on the second manipulation information.

14. The vehicle function control system according to claim 11, wherein each of the first detachable control device and the second detachable control device comprises a display disposed on an upper surface thereof, and wherein the controller is configured to transmit information indicative of completion of establishment of the second data path to the first detachable control device to turn off the display of the first detachable control device which is hidden by the second detachable control device stacked on the first detachable control device.

15. The vehicle function control system according to claim 14, wherein, when receiving from the first detachable control device information indicative of detachment of the second detachable control device, the controller is configured to restore a function allotted to the first detachable control device to a function performed before the second detachable control device is stacked.

16. The vehicle function control system according to claim 15, wherein the controller is configured to: release the second data path based on the information indicating detachment, and transmit information about the restored function to the first detachable control device to activate the display of the first detachable control device.

17. The vehicle function control system according to claim 10, wherein the first detachable control device and the second detachable control device comprise magnetic bodies, and wherein the attachment unit comprises electromagnets to selectively generate an attractive force and a repulsive force with respect to the magnetic bodies.

* * * * *